(12) United States Patent
Lin

(10) Patent No.: US 8,864,389 B2
(45) Date of Patent: Oct. 21, 2014

(54) OPTICAL FIBER CONNECTOR ASSEMBLY

(71) Applicants: Gloriole Electroptic Technology Corp., Kaohsiung (TW); Ample Sun Trading Limited, Tortola (VG)

(72) Inventor: Jim Lin, Kaohsiung (TW)

(73) Assignees: Gloriole Electroptic Technology Corp., Kaohsiung (TW); Ample Sun Trading Limited, Tortola (VG)

( * ) Notice: Subject to any disclaimer, the term of this patent is extended or adjusted under 35 U.S.C. 154(b) by 0 days.

(21) Appl. No.: 13/758,206

(22) Filed: Feb. 4, 2013

(65) Prior Publication Data

US 2014/0044394 A1    Feb. 13, 2014

(30) Foreign Application Priority Data

Aug. 10, 2012  (TW) .............. 101215473 A

(51) Int. Cl.
  *G02B 6/38*  (2006.01)
(52) U.S. Cl.
  CPC .......... *G02B 6/3897* (2013.01); *G02B 6/38* (2013.01)
  USPC ............................ 385/58; 385/60
(58) Field of Classification Search
  CPC .......... G02B 6/00; G02B 6/36; G02B 6/38; G02B 6/3816; G02B 6/3887; G02B 6/3831; G02B 6/3898; G02B 6/3869
  USPC ..................................... 385/58, 60
  See application file for complete search history.

(56) References Cited

U.S. PATENT DOCUMENTS

| | | | | |
|---|---|---|---|---|
| 4,726,647 A * | 2/1988 | Kakii et al. | ...... | 385/60 |
| 5,123,071 A * | 6/1992 | Mulholland et al. | ...... | 385/53 |
| 5,129,023 A * | 7/1992 | Anderson et al. | ...... | 385/70 |
| 5,136,672 A * | 8/1992 | Mulholland et al. | ...... | 385/53 |
| 5,142,597 A * | 8/1992 | Mulholland et al. | ...... | 385/56 |
| 5,317,663 A * | 5/1994 | Beard et al. | ...... | 385/70 |
| 5,734,770 A * | 3/1998 | Carpenter et al. | ...... | 385/72 |
| 6,254,278 B1 * | 7/2001 | Andrews et al. | ...... | 385/53 |
| 6,464,408 B1 * | 10/2002 | Nolan | ...... | 385/87 |
| 6,712,523 B2 * | 3/2004 | Zimmel | ...... | 385/72 |
| 6,749,344 B2 * | 6/2004 | Hamm et al. | ...... | 385/72 |
| 7,244,066 B2 * | 7/2007 | Theuerkorn | ...... | 385/53 |
| 2002/0067894 A1 * | 6/2002 | Scanzillo | ...... | 385/80 |
| 2002/0181888 A1 * | 12/2002 | Zimmel | ...... | 385/72 |
| 2002/0191919 A1 * | 12/2002 | Nolan | ...... | 385/78 |
| 2003/0169974 A1 * | 9/2003 | Ngo | ...... | 385/72 |
| 2004/0264873 A1 * | 12/2004 | Smith et al. | ...... | 385/53 |
| 2006/0088248 A1 * | 4/2006 | Tran et al. | ...... | 385/55 |
| 2009/0148104 A1 * | 6/2009 | Lu et al. | ...... | 385/72 |

(Continued)

*Primary Examiner* — Kaveh Kianni
(74) *Attorney, Agent, or Firm* — Dickstein Shapiro LLP

(57) ABSTRACT

An optical fiber connector includes a connector housing and a positioning unit. The connector housing has two opposite side walls, a base wall disposed between and interconnecting the side walls, and a lid disposed between and inter-engaging releasably the side walls. The connector housing defines an inner space, and an access opening in spatial communication with the inner space and covered by the lid. The positioning unit is mounted in the inner space and includes first and second holding members and a coupling sleeve extending into and interconnecting the first and second holding members. The positioning unit is inserted into the inner space through the access opening so as to be mounted in the inner space before covering the access opening with the lid.

9 Claims, 7 Drawing Sheets

(56) References Cited

U.S. PATENT DOCUMENTS

| | | | |
|---|---|---|---|
| 2010/0172616 A1* | 7/2010 | Lu et al. | 385/78 |
| 2010/0266244 A1* | 10/2010 | Lu et al. | 385/60 |
| 2010/0290741 A1* | 11/2010 | Lu et al. | 385/60 |
| 2010/0296779 A1* | 11/2010 | Lu et al. | 385/72 |
| 2011/0033158 A1* | 2/2011 | Smith et al. | 385/78 |
| 2011/0293223 A1* | 12/2011 | Shimazu et al. | 385/81 |
| 2012/0082416 A1* | 4/2012 | Katoh | 385/72 |
| 2012/0294572 A1* | 11/2012 | Petersen | 385/78 |

* cited by examiner

US 8,864,389 B2

OPTICAL FIBER CONNECTOR ASSEMBLY

CROSS-REFERENCE TO RELATED APPLICATION

This application claims priority of Taiwanese Application No. 101215473, filed on Aug. 10, 2012.

BACKGROUND OF THE INVENTION

1. Field of the Invention

This invention relates to an optical fiber connector, more particularly to an optical fiber connector assembly including an optical fiber connector.

2. Description of the Related Art

An optical fiber connector is required to have a positioning mechanism for matching optical fiber lines to be connected to each other by the optical fiber connector, so as to reduce optical loss due to misalignment between the optical fiber lines during light transmission therein.

FIGS. 1 and 2 illustrate a conventional optical fiber connector 100 for receiving a plug head 1021 of an optical fiber line 102. The optical fiber connector 100 includes a housing 10, first and second holding members 13, 14 mated with each other and mounted in the housing 10, and an elastic C-shaped sleeve 15 fitted into respective tubular parts 131, 141 of the first and second holding members 13, 14 for receiving fittingly a ferrule 1022 of the plug head 1021 therein. The housing 10 has a first housing half 11 and a second housing half 12 that is mated with the first housing half 11. In assembly, the C-shaped sleeve 15 is inserted into the tubular parts 131, 141 of the first and second holding members 13, 14, followed by inserting the first and second holding members 13, 14 into the first and second housing halves 11, 12, respectively. Subsequently, the first and second housing halves 11, 12 are mated and welded together through high frequency welding techniques. However, the welding temperature is relatively high and can result in deformation of the housing 10, which, in turn, results in adverse effect on the alignment of the optical fiber line 102 to be connected by the optical fiber connector 100.

SUMMARY OF THE INVENTION

Therefore, an object of the present invention is to provide an optical fiber connector assembly that can overcome the aforesaid drawback associated with the prior art.

According to this invention, there is provided an optical fiber connector assembly for connection of an optical fiber line. The optical fiber connector assembly comprises an optical fiber connector including a connector housing and a positioning unit. The connector housing has two opposite side walls opposite to each other in a first direction, a base wall disposed between and interconnecting the side walls, and a lid that is disposed opposite to the base wall in a second direction transverse to the first direction and that is disposed between and inter-engages releasably the side walls. The connector housing defines an inner space and an access opening that is in spatial communication with the inner space and that is covered by the lid. The positioning unit is mounted in the inner space and includes first and second holding members and a coupling sleeve extending into and interconnecting the first and second holding members. The positioning unit is inserted into the inner space through the access opening so as to be mounted in the inner space before covering the access opening with the lid.

BRIEF DESCRIPTION OF THE DRAWINGS

In drawings which illustrate an embodiment of the invention.

DETAILED DESCRIPTION OF THE PREFERRED EMBODIMENT

Figure 1:
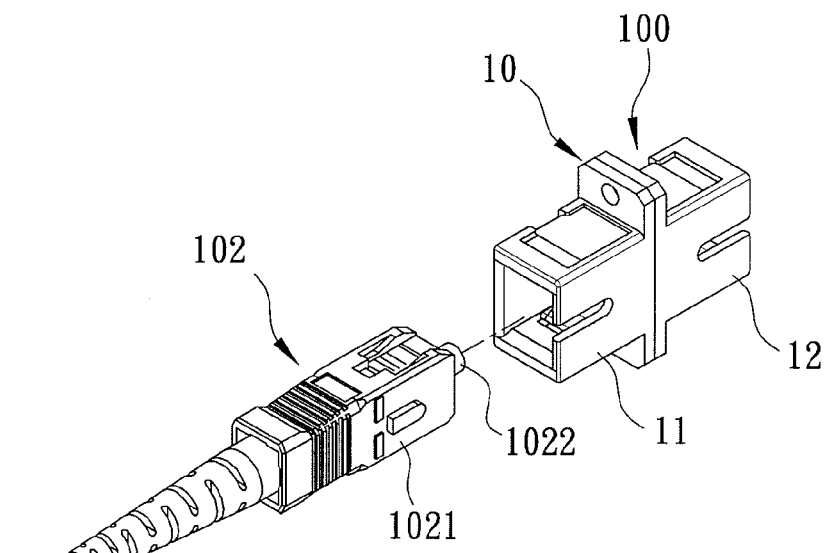
FIG. 1 is a perspective view illustrating a conventional optical fiber connector.
Figure 2:
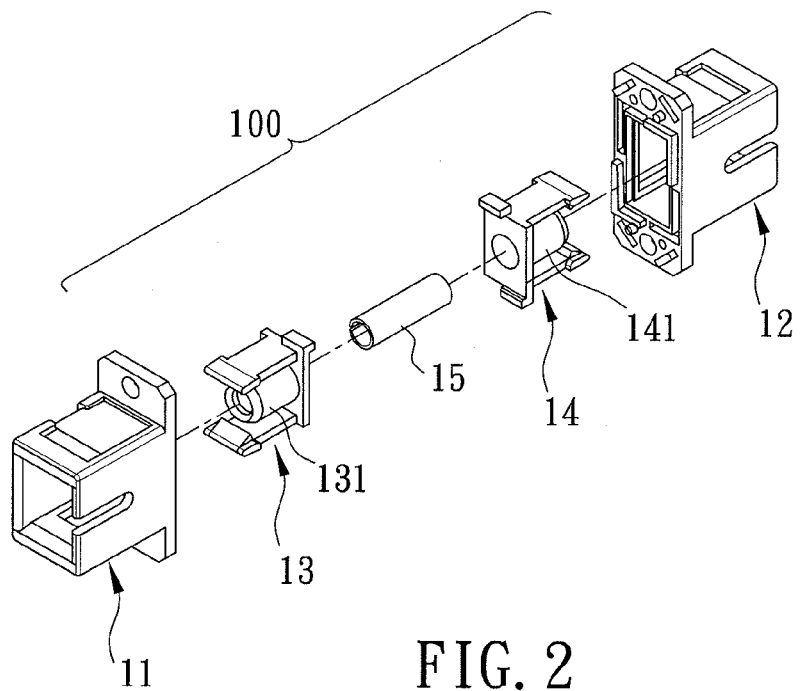
FIG. 2 is an exploded perspective view of the conventional optical fiber connector.
Figure 3:
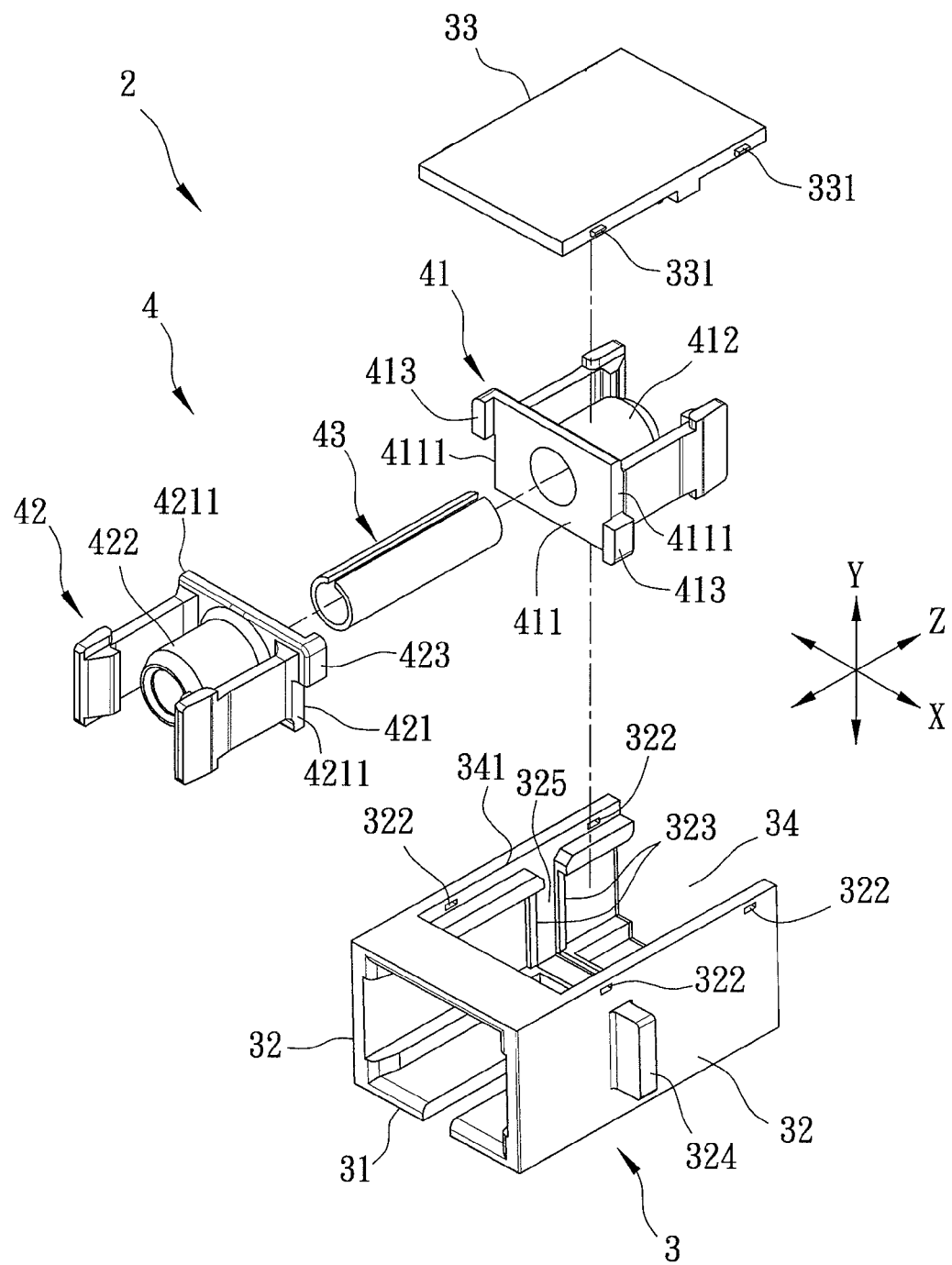
FIG. 3 is an exploded perspective view of the preferred embodiment of an optical fiber connector according to the present invention.
Figure 4:
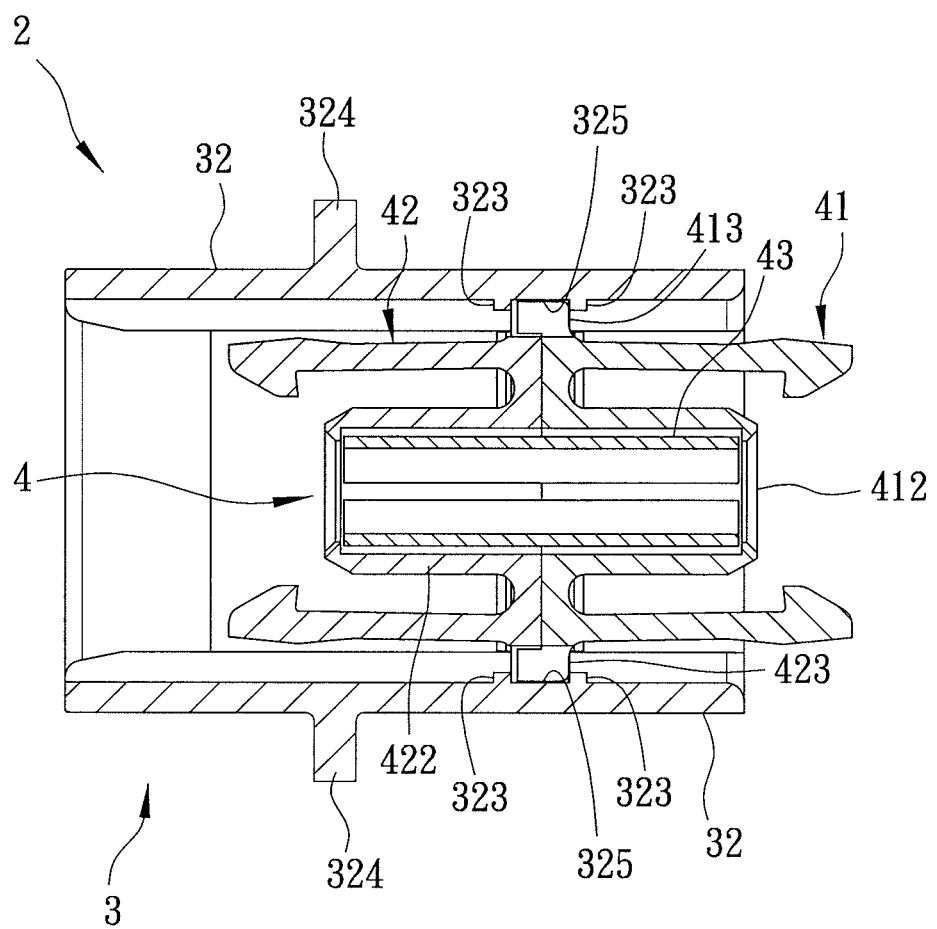
FIG. 4 is a sectional view of the preferred embodiment.

FIGS. 3 and 4 illustrate the preferred embodiment of an optical fiber connector 2 for connection of an optical fiber line 201 (see FIG. 8) according to the present invention. The optical fiber connector 2 includes a connector housing 3 and a positioning unit 4 mounted in the connector housing 3.

The connector housing 3 has two opposite side walls 32 opposite to each other in a first direction (X), abase wall 31 disposed between and interconnecting the side walls 32, and a lid 33 that is disposed opposite to the base wall 31 in a second direction (Y) transverse to the first direction (X), and that is disposed between and inter-engages releasably the side walls 32. The base wall 31 and the side walls 32 are in the form of a single piece, and are preferably made of resin. The connector housing 3 defines an inner space 34 and an access opening 341 that is in spatial communication with the inner space 34 and that is covered and closed by the lid 33.

Each of the side walls 32 is formed with an outer protrusion 324 protruding outwardly therefrom, a plurality of through-holes 322, and two opposite limiting bars 323 protruding therefrom into the inner space 34, extending in the second direction (Y) and spaced apart from each other in a third direction (Z) transverse to the first and second directions (X, Y). The limiting bars 323 of each of the side walls 32 cooperatively define a limiting groove 325 therebetween. The lid 33 is formed with a plurality of tongues 331 extending into and engaging the through-holes 322 in the side walls 32, respectively, so as to be detachably mounted to the side walls 32.

The positioning unit 4 includes first and second holding members 41, 42, and a coupling sleeve 43 extending into and interconnecting the first and second holding members 41, 42 for receiving a ferrule (not shown) of the optical fiber line 201 (see FIG. 8) therein. The positioning unit 4 is inserted into the inner space 34 through the access opening 341 so as to be mounted in the inner space 34 before covering the access opening 341 with the lid 33.

Each of the first and second holding members 41, 42 has a mating plate 411, 421 and a tubular part 412, 422 extending from the mating plate 411, 412 in the third direction (Z). The coupling sleeve 43 is C-shaped, and extends fittingly into the tubular parts 412, 422. The mating plate 411 of the first holding member 41 has two sides 4111 opposite to each other in the first direction (X) and formed with a pair of diagonally disposed first studs 413 protruding therefrom. The mating plate 421 of the second holding member 42 has two sides 4211 opposite to each other in the first direction (X) and formed with a pair of diagonally disposed second studs 423 protruding therefrom. The mating plates 411, 421 mate with and contact each other. The first studs 413 mate with the second studs 423 such that each of the first studs 413 is disposed adjacent to and is aligned with a corresponding one of the second studs 423 in the second direction (Y). Each adjacent pair of the first and second studs 413, 423 extends into the limiting groove 325 in a respective one of the side walls 32, and is limited by the limiting bars 323 formed at the respective one of the side walls 32, such that the first and second holding members 41, 42 are substantially prevented from movement in the connector housing 3 in the third direction (Z).

Figure 5:
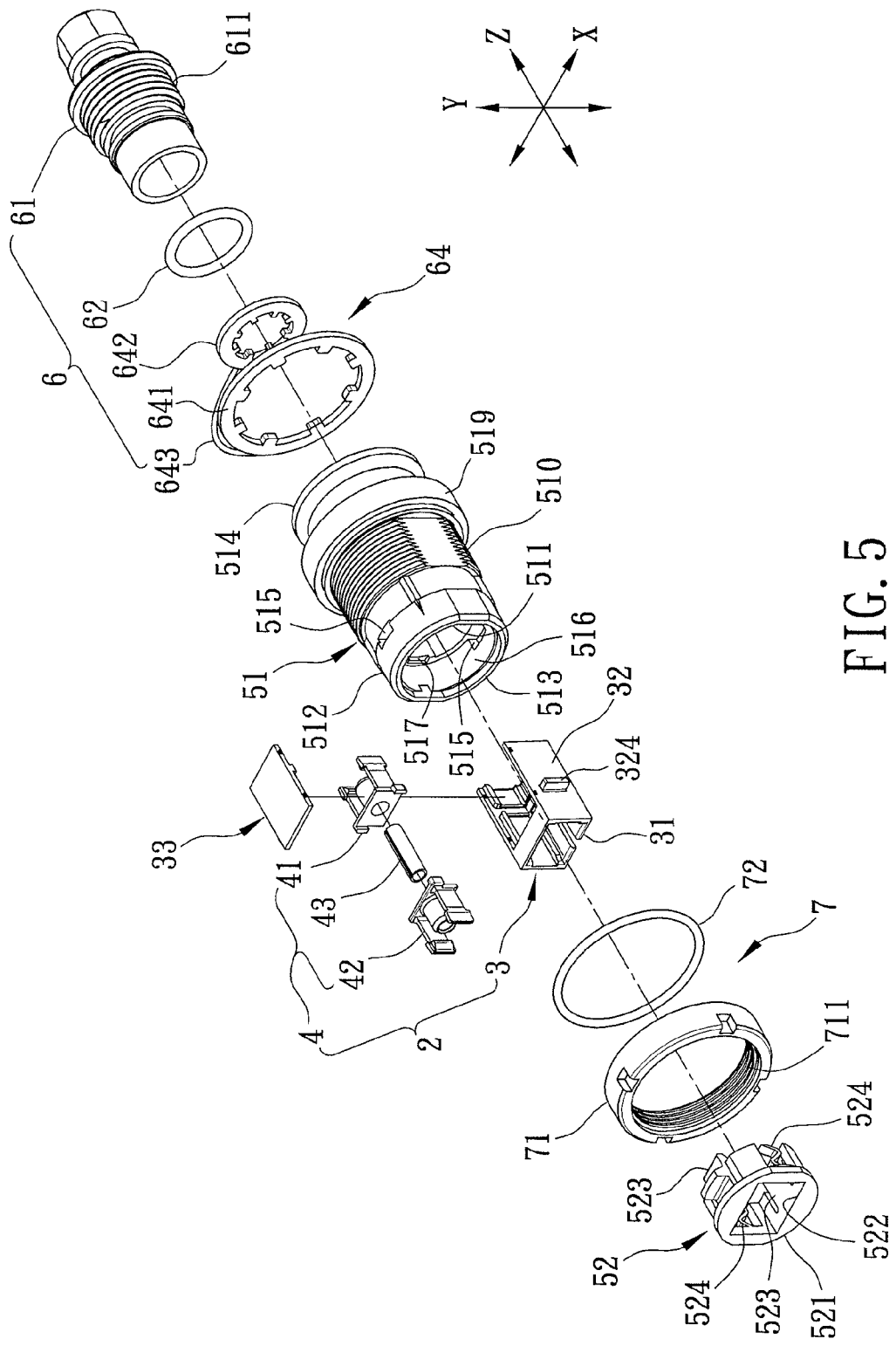
FIG. 5 is an exploded perspective view of an optical fiber connector assembly including the optical fiber connector of the preferred embodiment.
Figure 6:
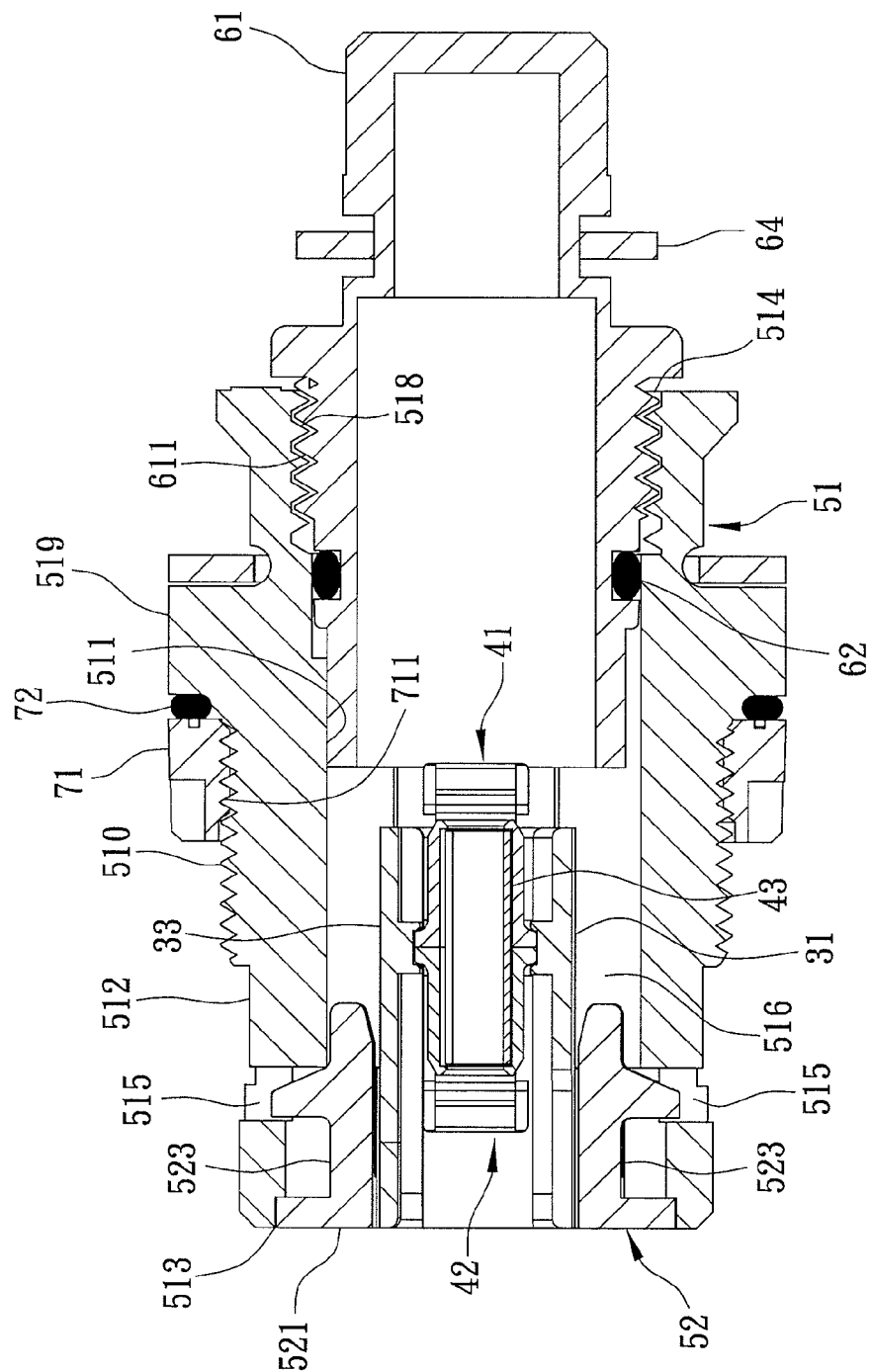
FIG. 6 is a sectional view of the optical fiber connector assembly.
Figure 7:
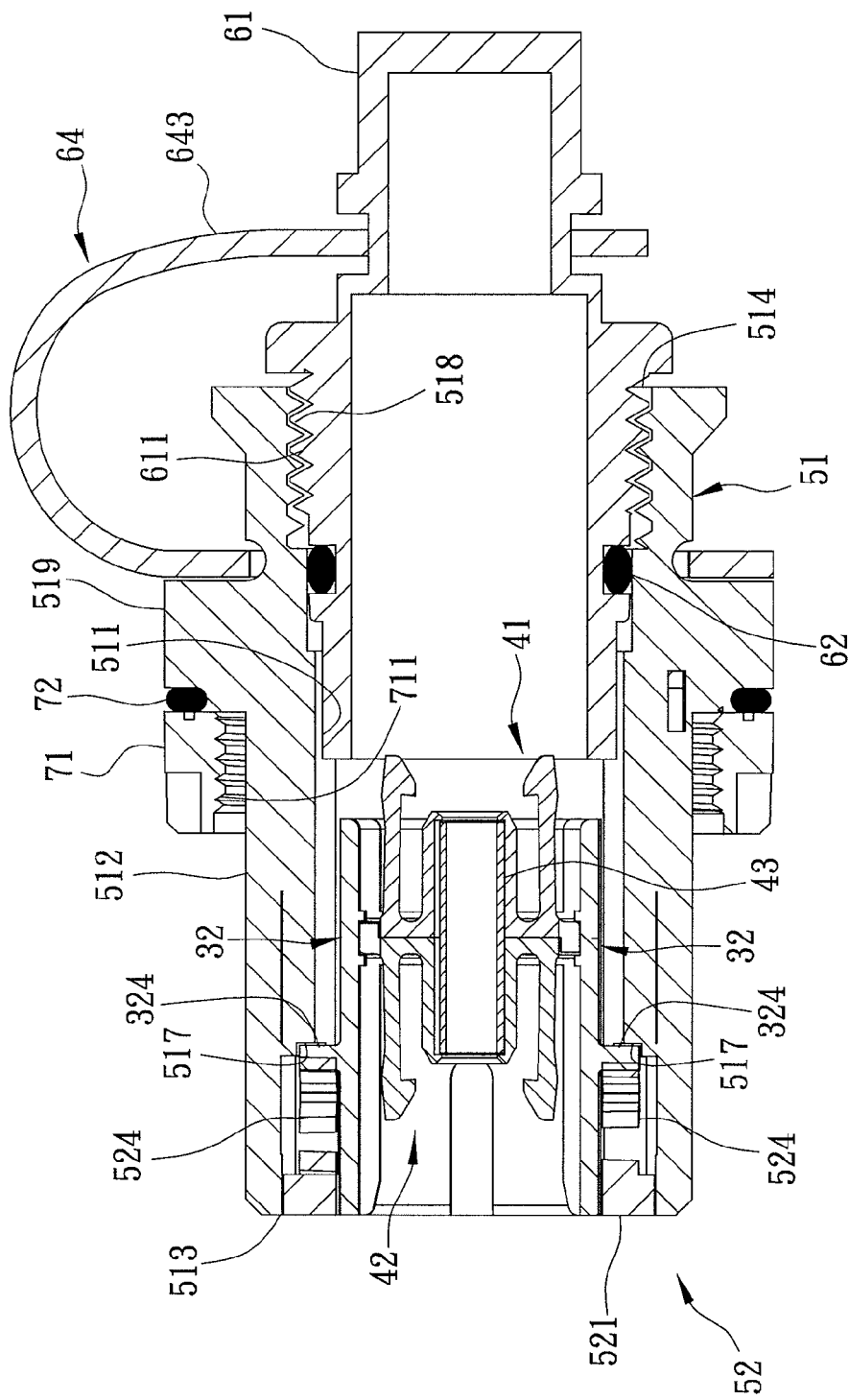
FIG. 7 is another sectional view of the optical fiber connector assembly.

FIGS. 5 to 7 illustrate an optical fiber connector assembly including an outer shell 51, a positioning member 52, a dust-preventing unit 6, a fastening unit 7, and the optical fiber connector 2 received in the outer shell 51.

The outer shell 51 defines a shell space 516 therein, and has first and second end openings 513, 514 that are opposite to each other in the third direction (Z) and that are in spatial communication with the shell space 516, an inner surface 511, an outer surface 512, and two opposite engaging holes 515 that are opposite to each other in the second direction (Y) and that are disposed adjacent to the first end opening 513. The inner surface 511 is formed with two stepped shoulders 517 opposite to each other in the first direction (X) and disposed adjacent to the first end opening 513, and an inner thread 518 disposed adjacent to the second end opening 514. The outer surface 512 is formed with an outer flange 519 and an outer thread 510 disposed between the first end opening 513 and the outer flange 519.

The positioning member 52 is received in the shell space 516, is disposed adjacent to the first end opening 513 in the outer shell 51, and has a loop-shaped portion 521 that defines an inlet opening 522 and that is fittingly sleeved on the connector housing 3, two opposite resilient arms 523, and two resilient legs 524. The resilient arms 523 extend from the loop-shaped portion 521 in the third direction (Z) into the shell space 516, and engage releasably and resiliently the engaging holes 515 in the outer shell 51, respectively. Each of the resilient legs 524 has a plurality of pleated portions so as to be resilient in the third direction (Z). The resilient legs 524 extend from the loop-shaped portion 521 in the third direction (Z) to urge resiliently the outer protrusions 324 of the side walls 32 to abut against the stepped shoulders 517, respectively, thereby positioning the optical fiber connector 2 in the shell space 516.

The dust-preventing unit 6 includes a cap member 61, a cap-connecting member 64, and an elastic sealing ring 62. The cap member 61 is formed with a ring-retaining groove 610 and an outer thread 611 engaging threadedly the inner thread 518 of the outer shell 51 for covering the second end opening 514 and for preventing dust and moisture from entering into the shell space 516 in the outer shell 51 and the inner space 34 in the connector housing 3. The elastic sealing ring 62 is retained in the ring-retaining groove 610 and abuts sealingly against the cap member 61 and the inner surface 511 of the outer shell 51. The cap-connecting member 64 has a first ring 641 sleeved around the outer shell 51, a second ring 642 sleeved around the cap member 61, and a flexible string 643 interconnecting the first and second rings 641, 642 so that the dust-preventing unit 6 can remain on the outer shell 51 when the outer thread 611 of the cap member 61 is disengaged from the inner thread 518 of the outer shell 51.

The fastening unit 7 includes a positioning ring 71 and an elastic ring 72 disposed between the positioning ring 71 and the outer flange 519 of the outer shell 51. The positioning ring 71 has an inner thread 711 engaging threadedly the outer thread 510 of the outer shell 51 for providing a force to press the elastic ring 72 against the outer flange 519.

Figure 8:
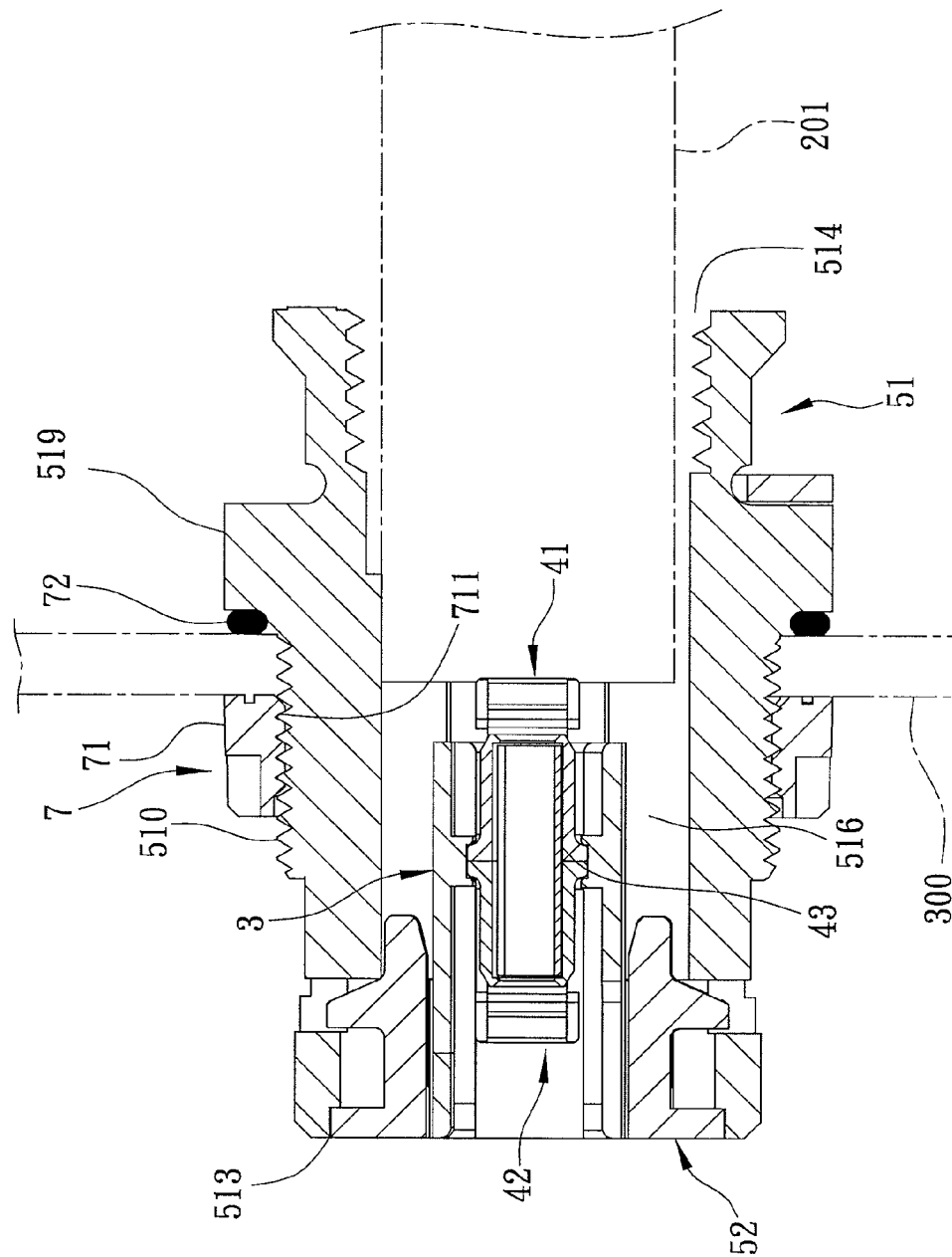
FIG. 8 is a sectional view illustrating how an optical fiber line is connected to the optical fiber connector assembly.

Referring to FIG. 8, in combination with FIGS. 6 and 7, when the optical fiber line 201 is to be inserted into the shell space 516 in the outer shell 51 of the optical fiber connector assembly, the outer thread 611 is disengaged from the inner thread 518 of the outer shell 51 to open the second end opening 514, followed by fastening the optical fiber connector assembly to a supporting plate 300 of a machine through the fastening unit 7 and subsequently inserting the optical fiber line 201 through the second end opening 514 into the shell space 516. The positioning ring 71 is fastened to the outer shell 51 so as to tightly clamp the supporting plate 300 and the elastic ring 72 between the positioning ring 71 and the outer flange 519. It is noted that the outer shell 51 can be provided with a sign or a mark (not shown) thereon indicating how the optical fiber line is to be correctly inserted into the shell space 516.

With the inclusion of the connector housing 3 having the access opening 341 and the lid 33 covering the access opening 341, in the optical fiber connector 2 of this invention, the aforesaid drawback associated with the prior art can be eliminated.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. An optical fiber connector assembly for connection of an optical fiber line, said optical fiber connector assembly comprising:

an optical fiber connector including
a connector housing having two opposite side walls opposite to each other in a first direction, a base wall disposed between and interconnecting said side walls, and a lid that is disposed opposite to said base wall in a second direction transverse to the first direction and releasably disposed between said side walls, said connector housing defining an inner space and an access opening that is in spatial communication with said inner space and that is covered by said lid, each of said side walls being formed with an outer protrusion protruding outwardly therefrom, and
a positioning unit mounted in said inner space and including first and second holding members and a coupling sleeve extending into and interconnecting said first and second holding members, said positioning unit being inserted into said inner space through said access opening so as to be mounted in said inner space before covering said access opening with said lid;
an outer shell defining a shell space therein and having an inner surface that is formed with two stepped shoulders, said connector housing being received in said shell space; and
a positioning member being received in said shell space and having a loop-shaped portion that is fittingly sleeved on said connector housing, a plurality of resilient arms that extend from said loop-shaped portion into said shell space and that engage releasably and resiliently said outer shell, and two resilient legs extending from said loop-shaped portion to urge resiliently said outer protrusions of said side walls to abut against said stepped shoulders, respectively.

2. The optical fiber connector assembly of claim 1, further comprising a dust-preventing unit that includes a cap member, said outer shell having first and second end openings that are opposite to each other in a third direction transverse to the first and second directions and that are in spatial communication with said shell space, said positioning member being disposed adjacent to said first end opening, said cap member engaging releasably said outer shell to cover said second end opening.

3. The optical fiber connector assembly of claim 2, wherein said cap member is formed with an outer thread, said outer shell being formed with an inner thread that engages threadedly said outer thread.

4. The optical fiber connector assembly of claim 3, further comprising a fastening unit that includes a positioning ring and an elastic ring, said outer shell being further formed with an outer flange, said elastic ring being disposed between said positioning ring and said outer flange, said positioning ring engaging threadedly said outer shell for providing a force to press said elastic ring against said outer flange.

5. The optical fiber connector assembly of claim 4, wherein said positioning ring is formed with an inner thread, said outer shell being formed with an outer thread that engages said inner thread of said positioning ring.

6. The optical fiber connector assembly of claim 2, wherein said dust-preventing unit further includes a cap-connecting member that has a first ring sleeved around said outer shell, a second ring sleeved around said cap member, and a flexible string interconnecting said first and second rings.

7. The optical fiber connector assembly of claim 1, wherein each of said side walls of said connector housing is further formed with two opposite limiting bars protruding therefrom into said inner space, said limiting bars of each of said side walls defining a limiting groove therebetween, each of said first and second holding members of said positioning unit having a mating plate, said mating plate of each of said first and second holding members having two sides opposite to each other in the first direction, said sides of said mating plate of each of said first and second holding members being formed with respective studs, each of which extends into said limiting groove in a respective one of said side walls and is limited by said limiting bars formed at the respective one of said side walls, such that said first and second holding members are substantially prevented from movement in said connector housing in a third direction transverse to the first and second directions.

8. The optical fiber connector assembly of claim 1, wherein said lid of said connector housing engages said side walls in a tongue-and-groove engaging manner.

9. The optical fiber connector assembly of claim 8, wherein said side walls of said connector housing are formed with a plurality of through-holes and said lid is formed with a plurality of tongues extending into and engaging said through-holes in said side walls, respectively.

* * * * *